No. 648,160. Patented Apr. 24, 1900.
J. A. CARLSON.
TENSION DEVICE FOR GRAIN BINDERS.
(Application filed Aug. 26, 1899.)
(No Model.)
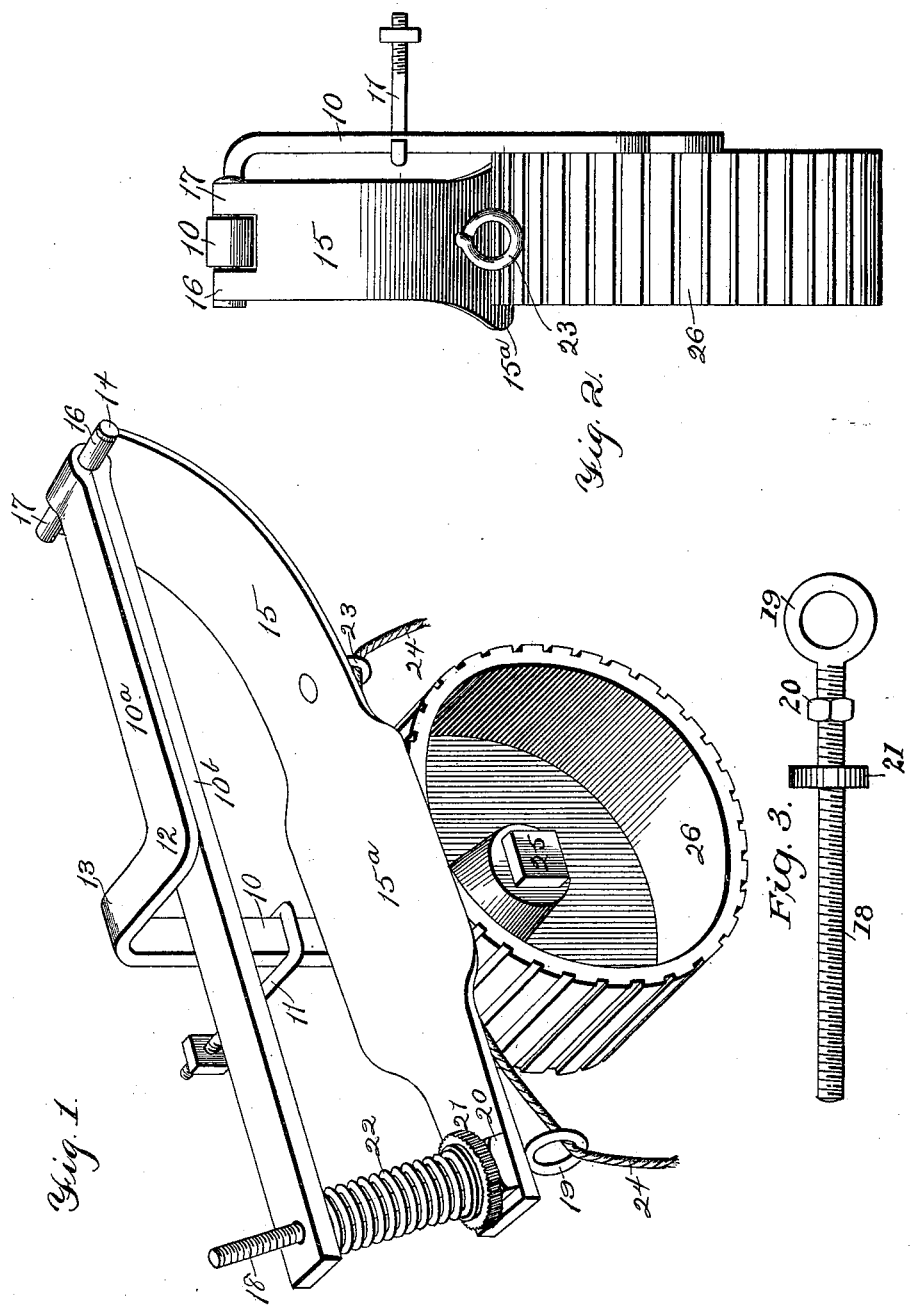

UNITED STATES PATENT OFFICE.

JOHN A. CARLSON, OF STRATFORD, IOWA.

TENSION DEVICE FOR GRAIN-BINDERS.

SPECIFICATION forming part of Letters Patent No. 648,160, dated April 24, 1900.

Application filed August 26, 1899. Serial No. 728,560. (No model.)

*To all whom it may concern:*

Be it known that I, JOHN A. CARLSON, a citizen of the United States, residing at Stratford, in the county of Hamilton and State of Iowa, have invented a new and useful Tension Device for Grain-Binders, of which the following is a specification.

The object of this invention is to provide improved means for regulating the tension of an intermittently-traveling cord employed in automatically binding grain on a harvester.

My invention consists in the construction, arrangement, and combination of elements hereinafter set forth, pointed out in my claims, and illustrated by the accompanying drawings, in which—

Figure 1 is a perspective showing my device in position for use, but detached from a harvester. Fig. 2 is an end elevation of the device. Fig. 3 is a detail view of a portion of the device.

In the construction of the device as shown the numeral 10 designates a bracket formed of a single piece of bar metal and arranged to be clamped fast to a suitable portion of the frame of a harvester (not shown) by means of a clamping-screw 11 embracing said bracket. One end portion of the bracket is vertically positioned and embraced by the clamping-screw, and the major portion of the bracket lies in a horizontal position and is connected to the vertical portion by a compound, (bend indicated on the drawings by the numerals 12 13.) The major portion of the bracket 10 is formed of two parallel members $10^a$ $10^b$, the former upon the latter and integrally connected thereto. The member $10^b$ is of a length approximating to double that of the member $10^a$ and is provided with an aperture in its extremity. A horizontal seat, aperture, or bore is formed between the members $10^a$ $10^b$ at the integral juncture of said members, and a pivotal pin 14 is mounted therein and projects laterally equal distances from the bracket. A tension-plate 15 is provided, made from bar metal, with a laterally bossed or broadened central portion $15^a$ of greater width than the end portions thereof. The tension-plate is flat throughout the major portion of its length and is curved upwardly in one end portion and forked at its extremity. The arms 16 17 of the forked extremity of the tension-plate are bent over and pivoted upon the projecting portions of the pivotal pin 14 and hinged thereby to the bracket 10. The end portion of the tension-plate 15, opposite the forked extremity thereof, is apertured to receive a screw 18, which loosely traverses the aperture in the bracket and is seated in the aperture of the tension-plate. An eye 19 is formed on the lower end of the screw 18 below the tension-plate, and nuts 20 21 are mounted on the screw immediately above said plate. An expansive coil-spring 22 is mounted on the screw 18 and is confined between the adjusting-nut 21 and the extremity of the bracket. The tension of the spring may be adjusted by adjustment of the nut 21 on the screw 18. An eye 23 is mounted on and extends downwardly from the curved portion of the tension-plate 15, and the binding-twine 24 is threaded through the eyes 23 19. A lag-screw 25 is seated in the lower end of the vertical portion of the bracket 10 and projects laterally therefrom beneath the tension-plate 15. A tension-wheel 26 is mounted for revolution on the lag-screw 25 and is provided with a wide flange grooved or corrugated transversely of its face. The periphery of the wheel or face of the flange thereof engages the bight of the binding-twine 24 and presses it against the lower face of the tension-plate, or, to state it the other way, the bight of the binding-twine travels longitudinally in contact with the face of the wheel and is pressed against the grooved periphery of the flange of the wheel by the lower face of the tension-plate, the plate being yieldingly pressed by the spring 22 reacting upon the bracket. Thus tension is applied to the twine to limit and retard the travel thereof to a predetermined degree.

It is obvious that the tension-plate 15 is practically a lever that can be readily adjusted relative to the tension-wheel 26 by means of the screw 18 and nut 21 and the spring 22 in such a manner that a yielding pressure is exerted upon the twine that passes between the central portion of the tension-plate and the periphery of the wheel as required to advance the twine and retain it taut.

I claim as my invention—

1. In a tension device for grain-binders, a bracket consisting of a horizontal portion and a vertical portion, a tension-plate pivotally connected with one end of the horizontal portion of the bracket and adjustably connected with the other end by means of a screw, a tension-wheel mounted on the vertical portion of the bracket to engage the bottom face of the central portion of the tension-plate and means for directing the twine relative to the tension-plate and wheel, arranged and combined to operate in the manner set forth for the purposes stated.

2. In a tension device for grain-binders, a bracket consisting of a horizontal portion and a vertical portion adapted for supporting a tension-wheel under the tension-plate, a tension-plate pivotally connected with one end of the horizontal portion of the bracket and adjustably connected with the other end by means of a screw, a tension-wheel mounted on the vertical portion of the bracket to engage the bottom face of the central portion of the tension-plate and means for directing twine relative to the tension-plate and wheel, a coil-spring on the screw, a nut on the screw for fastening the screw to the tension-plate and a nut on the screw for regulating the tension of the spring, arranged and combined to operate in the manner set forth for the purposes stated.

3. A tension device for grain-binders comprising a bracket adapted to be fixed to a harvesting-machine, a tension-plate pivoted to one end of the bracket and provided with an eye on its under side, a screw, having an eye at one end, extended through apertures in the ends of the bracket and tension-plate, a coil-spring on the screw, a nut on the screw for fastening the screw to the tension-plate, a nut on the screw for regulating the tension of the spring and a tension-wheel mounted on the bracket to engage the under surface of the tension-plate, all arranged and combined to operate in the manner set forth for the purposes stated.

4. The combination of the bracket, the tension-plate hinged thereto and formed with a broadened central portion, the screw passing through the bracket and plate and working loosely in the bracket, the adjusting-nut on the screw, the expansive coil-spring on the screw between the adjusting-nut and bracket, the guiding-eyes below the tension-plate, and the tension-wheel pivoted on the bracket and in opposition to the broadened central portion of the plate, the periphery of the wheel being grooved transversely.

JOHN A. CARLSON.

Witnesses:
J. W. SWEDLUND,
A. C. DEO.